(12) United States Patent
Tanio et al.

(10) Patent No.: US 9,583,232 B2
(45) Date of Patent: Feb. 28, 2017

(54) ELECTRICALLY CONDUCTIVE RUBBER COMPOSITION, TRANSFER ROLLER, AND IMAGE FORMING APPARATUS

(71) Applicant: SUMITOMO RUBBER INDUSTRIES, LTD., Kobe-shi, Kyogo (JP)

(72) Inventors: Yusuke Tanio, Kobe (JP); Naoyuki Satoyoshi, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 12 days.

(21) Appl. No.: 14/196,527

(22) Filed: Mar. 4, 2014

(65) Prior Publication Data

US 2014/0287900 A1    Sep. 25, 2014

(30) Foreign Application Priority Data

Mar. 21, 2013  (JP) ................. 2013-058801

(51) Int. Cl.
    *F16C 13/00*    (2006.01)
    *H01B 1/24*    (2006.01)
    *F16L 13/00*    (2006.01)
    *B29L 31/32*    (2006.01)

(52) U.S. Cl.
CPC ............... *H01B 1/24* (2013.01); *F16L 13/00* (2013.01); *B29L 2031/326* (2013.01)

(58) Field of Classification Search
CPC ............. F16C 13/00; B29L 2031/326; Y10T 29/4956; Y10T 29/49563
USPC .............................. 492/53, 56, 59
See application file for complete search history.

(56) References Cited

U.S. PATENT DOCUMENTS

| | | | | |
|---|---|---|---|---|
| 6,140,380 A | * | 10/2000 | Mauk ..................... | C08J 9/06 516/11 |
| 6,433,090 B1 | * | 8/2002 | Ellul ..................... | C08L 23/16 525/191 |
| 6,458,883 B1 | | 10/2002 | Takashima et al. | |
| 6,503,985 B1 | * | 1/2003 | Ellul ..................... | C08L 23/16 525/191 |

(Continued)

FOREIGN PATENT DOCUMENTS

| | | |
|---|---|---|
| CN | 1867870 A | 11/2006 |
| JP | 63039932 A * | 2/1988 |

(Continued)

OTHER PUBLICATIONS

English machine translation of JP 2006193609 A, published Jul. 27, 2006.*

(Continued)

*Primary Examiner* — Essama Omgba
(74) *Attorney, Agent, or Firm* — Birch, Stewart, Kolasch & Birch, LLP

(57) ABSTRACT

An electrically conductive rubber composition which can be efficiently and sufficiently foamed and crosslinked by means of a continuous crosslinking apparatus including a microwave crosslinking device and a hot air crosslinking device without generation of ammonia and carbon monoxide. The electrically conductive rubber composition comprises a rubber component, a crosslinking component for crosslinking the rubber component, and a foaming component including sodium hydrogen carbonate and citric acid.

7 Claims, 2 Drawing Sheets

(56) References Cited

U.S. PATENT DOCUMENTS

| | | | |
|---|---|---|---|
| 6,713,520 B2* | 3/2004 | Sahnoune | C08J 9/0061 521/53 |
| 8,037,607 B2* | 10/2011 | Imasaka et al. | 29/895.32 |
| 9,011,306 B2* | 4/2015 | Mizumoto | G03G 15/0818 399/280 |
| 2003/0013813 A1* | 1/2003 | Ellul | C08L 23/16 525/191 |
| 2004/0001942 A1* | 1/2004 | Sahnoune | C08J 9/0061 428/304.4 |
| 2007/0117905 A1* | 5/2007 | Toyoda et al. | 524/487 |
| 2009/0215916 A1* | 8/2009 | Krohnke | C08J 9/08 521/123 |
| 2010/0056656 A1* | 3/2010 | Matsuoka et al. | 521/96 |
| 2012/0129667 A1* | 5/2012 | Mizumoto | G03G 15/1685 492/18 |
| 2013/0203573 A1* | 8/2013 | Satoyoshi | H01B 1/125 492/59 |

FOREIGN PATENT DOCUMENTS

| | | | | |
|---|---|---|---|---|
| JP | 11021364 A | * | 1/1999 | |
| JP | 2000-265008 A | | 9/2000 | |
| JP | 2004-521173 A | | 7/2004 | |
| JP | 2006193609 A | * | 7/2006 | C08J 9/06 |
| JP | 2007-177082 A | | 7/2007 | |
| JP | 2007-309992 A | | 11/2007 | |
| JP | 2008-180273 A | | 8/2008 | |
| JP | 2008214439 A | * | 9/2008 | C08J 9/06 |
| JP | 2011-122021 A | | 6/2011 | |

OTHER PUBLICATIONS

English machine translation of JP 2008214439 A, publsihed Sep. 18, 2008.*

English machine translation of JP-2008-180273-A dated Aug. 7, 2008.

* cited by examiner

ELECTRICALLY CONDUCTIVE RUBBER COMPOSITION, TRANSFER ROLLER, AND IMAGE FORMING APPARATUS

TECHNICAL FIELD

The present invention relates to an electrically conductive rubber composition, a transfer roller which is produced by foaming and crosslinking the electrically conductive rubber composition in a tubular form to be incorporated in an electrophotographic image forming apparatus for use, and an image forming apparatus incorporating the transfer roller.

BACKGROUND ART

In an electrophotographic image forming apparatus such as a laser printer, an electrostatic copying machine, a plain paper facsimile machine or a printer-copier-facsimile multifunction machine, for example, an image is generally formed on a surface of a sheet (the term "sheet" is herein defined to include a paper sheet, a plastic film such as an OHP film and the like, and this definition is effective in the following description) through the following process steps.

First, a surface of a photoreceptor body having photoconductivity is evenly electrically charged and, in this state, exposed to light, whereby an electrostatic latent image corresponding to an image to be formed on the surface of the sheet is formed on the surface of the photoreceptor body (charging step and exposing step).

Then, a toner (minute color particles) preliminarily electrically charged at a predetermined potential is brought into contact with the surface of the photoreceptor body. Thus, the toner selectively adheres to the surface of the photoreceptor body according to the potential pattern of the electrostatic latent image, whereby the electrostatic latent image is developed into a toner image (developing step).

Subsequently, the toner image is transferred onto the surface of the sheet (transfer step), and fixed to the surface of the sheet (fixing step). Thus, the image is formed on the surface of the sheet.

In the transfer step, the toner image formed on the surface of the photoreceptor body may be directly transferred to the surface of the sheet, or may be once transferred to a surface of an image carrier (first transfer step) and then transferred to the surface of the sheet (second transfer step).

A transfer roller formed from an electrically conductive rubber composition and having a predetermined roller resistance is used for transferring the toner image from the surface of the photoreceptor body to the surface of the sheet in the transfer step, for transferring the toner image from the surface of the photoreceptor body to the surface of the image carrier in the first transfer step, or for transferring the toner image from the surface of the image carrier to the surface of the sheet in the second transfer step.

In the transfer step for the direct transfer, for example, a predetermined transfer voltage is applied between the photoreceptor body and the transfer roller kept in press contact with each other with a predetermined pressing force and, in this state, the sheet is passed between the photoreceptor body and the transfer roller, whereby the toner image formed on the surface of the photoreceptor body is transferred to the surface of the sheet.

Lately, transfer rollers to be incorporated in general-purpose laser printers and the like particularly for use in developing countries tend to be required to have a simplified construction so as to be produced at lower costs possibly by using versatile materials.

To meet the requirement, transfer rollers having a porous structure are widely used. The porous structure requires a reduced amount of a material to reduce material costs, and has a reduced weight to reduce transportation costs. The porous structure imparts the transfer roller with proper flexibility even if a plasticizer is not blended or blended in a reduced amount in the material.

For production of the transfer roller of the porous structure, it is preferred to employ the following continuous production method, for example, in order to improve the productivity of the transfer roller to further reduce the production costs of the transfer roller.

That is, the transfer roller can be continuously produced at higher productivity by extruding an electrically conductive rubber composition into an elongated tubular body by means of an extruder, continuously feeding out the extruded tubular body in the elongated state without cutting the tubular body to pass the tubular body through a continuous crosslinking apparatus including a microwave crosslinking device and a hot air crosslinking device for continuous foaming and crosslinking, and then cutting the resulting tubular body to a predetermined length.

It is preferred to use an expensive ion conductive rubber such as an epichlorohydrin rubber in combination with a crosslinkable rubber as a rubber component for the electrically conductive rubber composition in order to reduce the material costs and further reduce the production costs of the transfer roller.

A typical example of the crosslinkable rubber is an acrylonitrile butadiene rubber (NBR). In order to further reduce the production costs of the transfer roller to meet the aforementioned requirement, it is more preferred to use a styrene butadiene rubber (SBR) and an ethylene propylene diene rubber (EPDM) in combination as the crosslinkable rubber.

The combinational use of the SBR and the EPDM makes it possible to impart the transfer roller with proper ozone resistance while further reducing the material costs.

That is, it is possible to reduce the proportion of the expensive ion conductive rubber required for the production of the transfer roller having a comparable roller resistance. In addition, the SBR is more versatile and less costly than the NBR, so that the material costs can be further reduced.

However, the SBR is insufficient in resistance to ozone to be generated inside the laser printer or the like, i.e., has poorer ozone resistance. Therefore, the SBR is used in combination with the EPDM.

The EPDM per se does not only have excellent ozone resistance, but also serves to suppress degradation of the SBR due to ozone. This improves the ozone resistance of the transfer roller.

An azodicarbonamide ($H_2NOCN\!=\!NCONH_2$, ADCA) forming agent and an urea foaming assisting agent are typically used in combination as a foaming component.

However, ADCA is decomposed through molecular vibration heating by irradiation with microwaves to produce cyanic acid, isocyanic acid, cyamelide, cyanuric acid and isocyanuric acid and the like as decomposition residue.

Urea is also decomposed through molecular vibration heating by irradiation with microwaves to produce cyanic acid and the like as decomposition residue.

These decomposition residues are liable to impair the electrical conductivity of the ion conductive rubber, to inhibit the crosslinking reaction of the rubber component and to contaminate the photoreceptor body.

To cope with this, Patent Literatures 1 and 2 propose that an additive such as sodium hydrogen carbonate (sodium bicarbonate) thermally decomposable to produce water is used in combination with ADCA and urea.

In the presence of the water produced by the decomposition of sodium hydrogen carbonate, it is possible to convert the decomposition residues into substances free from the impairment of the electrical conductivity, the inhibition of the crosslinking reaction and the contamination of the photoreceptor body through the molecular vibration heating by the irradiation with the microwaves.

CITATION LIST

Patent Literature

Patent Literature 1: JP2007-309992A
Patent Literature 2: JP2008-180273A

SUMMARY OF THE INVENTION

Problem to be Solve by the Invention

According to the studies conducted by the inventor of the present invention, the use of the ADCA foaming agent suffers from generation of ammonia ($NH_3$) and carbon monoxide (CO) during the decomposition and foaming process.

These substances are liable to influence the working environment for the production of the transfer roller. Particularly, these substances are generated in a great amount in the aforementioned continuous foaming and crosslinking step after the continuous extrusion of the electrically conductive rubber composition. Therefore, the treatment of these substances is problematic.

In addition, it is impossible to convert these substances into other substances even if sodium hydrogen carbonate is used in combination with ADCA to produce water as described in Patent Literatures 1 and 2.

It is an object of the present invention to provide an electrically conductive rubber composition which can be efficiently and sufficiently foamed and crosslinked by means of the continuous crosslinking apparatus including the microwave crosslinking device and the hot air crosslinking device without the generation of ammonia and carbon monoxide, and to provide a transfer roller produced from the electrically conductive rubber composition, and an image forming apparatus incorporating the transfer roller.

Solution to Problem

The present invention provides an electrically conductive rubber composition which can be foamed and crosslinked by means of a continuous crosslinking apparatus including a microwave crosslinking device and a hot air crosslinking device, the electrically conductive rubber composition comprising: a rubber component; a crosslinking component for crosslinking the rubber component; and a foaming component for foaming the rubber component; wherein the foaming component includes sodium hydrogen carbonate as a foaming agent and citric acid as a foaming assisting agent.

The present invention also provides a transfer roller produced from the inventive electrically conductive rubber composition.

The present invention also provides an image forming apparatus incorporating the inventive transfer roller.

The sodium hydrogen carbonate foaming agent is free from the generation of ammonia and carbon monoxide even if being decomposed. This significantly reduces the influence on the working environment.

If sodium hydrogen carbonate is used alone as the foaming component, however, the foam cell diameters of foam cells present adjacent to the outer surface of the transfer roller would be excessively reduced.

In the present invention, in contrast, the sodium hydrogen carbonate foaming agent is used in combination with the citric acid foaming assisting agent. This reduces the foaming starting temperature of sodium hydrogen carbonate so as to properly foam the entire tubular body. Thus, the foam cell diameters can be made more uniform in the entire transfer roller.

In addition, citric acid is free from the generation of ammonia and carbon monoxide even if being decomposed. Therefore, the combinational use of sodium hydrogen carbonate and citric acid significantly reduces the influence on the working environment.

Citric acid anhydride or citric acid monohydrate may be used as the citric acid foaming assisting agent.

The proportion of sodium hydrogen carbonate is preferably not less than 0.1 part by mass and not greater than 5 parts by mass based on 100 parts by mass of the rubber component, and the proportion of citric acid is preferably not less than 0.1 part by mass and not greater than 0.5 parts by mass based on 100 parts by mass of the rubber component on an anhydride basis.

If the proportion of sodium hydrogen carbonate is less than the aforementioned range, it will be impossible to sufficiently foam a tubular body formed by extruding the rubber composition by means of an extruder. If the proportion of sodium hydrogen carbonate is greater than the aforementioned range, the transfer roller is liable to be deteriorated in roller resistance and, particularly, in resistance characteristics when being allowed to stand at a higher temperature.

Where the proportion of sodium hydrogen carbonate is not less than 0.1 part by mass and not greater than 5 parts by mass based on 100 parts by mass of the rubber component, on the other hand, it is possible to sufficiently foam the tubular body while suppressing the deterioration in the resistance characteristics of the transfer roller when the transfer roller is allowed to stand at a higher temperature.

If the proportion of citric acid is less than the aforementioned range, it will be impossible to sufficiently provide the aforementioned effect of reducing the foaming starting temperature of sodium hydrogen carbonate to allow the transfer roller to have more uniform foam cell diameters as a whole. If the proportion of citric acid is greater than the aforementioned range, it will be impossible to provide the effect of making the foam cell diameters more uniform in the entire transfer roller.

Where the proportion of citric acid is not less than 0.1 part by mass and not greater than 0.5 parts by mass based on 100 parts by mass of the rubber component, on the other hand, it is possible to further improve the effect of making the foam cell diameters more uniform in the entire transfer roller.

The rubber component preferably comprises at least an SBR, an EPDM and an epichlorohydrin rubber.

Where the SBR and the EPDM are used as the crosslinkable rubber instead of the NBR in combination with the epichlorohydrin rubber, as described above, it is possible to impart the transfer roller with excellent ozone resistance while further reducing the material costs.

At least one polar rubber selected from the group consisting of an NBR, a chloroprene rubber (CR), a butadiene rubber (BR) and an acryl rubber (ACM) is preferably used as the rubber component.

This makes it possible to finely control the roller resistance of the transfer roller.

Further, the inventive transfer roller is preferably produced through the step of extruding the inventive electrically conductive rubber composition into a tubular body, and continuously foaming and crosslinking the rubber composition of the tubular body by means of the continuous crosslinking apparatus including the microwave crosslinking device and the hot air crosslinking device.

This improves the productivity of the transfer roller to further reduce the production costs of the transfer roller as described above.

Effects of the Invention

The present invention provides the electrically conductive rubber composition which can be efficiently and sufficiently foamed and crosslinked by means of the continuous crosslinking apparatus including the microwave crosslinking device and the hot air crosslinking device without the generation of ammonia and carbon monoxide, and provides the transfer roller produced from the electrically conductive rubber composition, and the image forming apparatus incorporating the transfer roller.

EMBODIMENTS OF THE INVENTION

<<Electrically Conductive Rubber Composition>>

Figure 1:
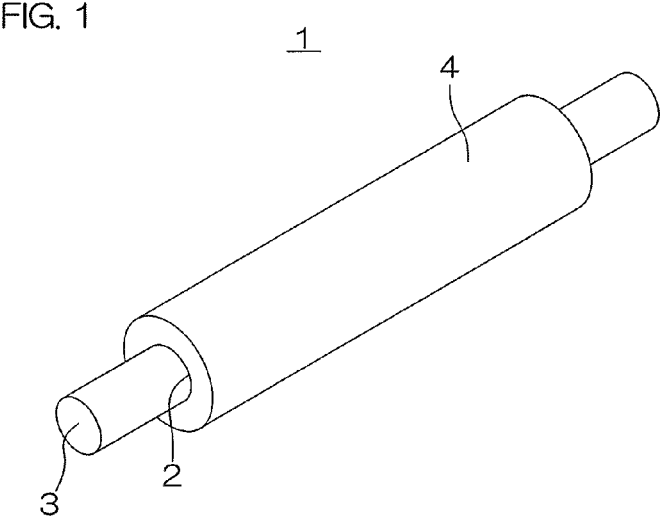
FIG. 1 is a perspective view illustrating an exemplary transfer roller according to one embodiment of the present invention.

The inventive electrically conductive rubber composition contains a rubber component, a crosslinking component for crosslinking the rubber component, and a foaming component for foaming the rubber component. The foaming component includes sodium hydrogen carbonate as a foaming agent, and citric acid as a foaming assisting agent.

The rubber component preferably includes at least an SBR, an EPDM and an epichlorohydrin rubber.

Among these rubbers, the SBR is nonpolar, and has an extremely low microwave absorbing efficiency. Therefore, it is often impossible to sufficiently elevate the temperature of the entire tubular body to a sodium hydrogen carbonate foaming temperature by passing the tubular body through the continuous crosslinking apparatus as described above, so that foam cells present adjacent the outer surface of the transfer roller are more liable to have excessively small foam cell diameters.

According to the present invention, in contrast, the combinational use of sodium hydrogen carbonate and citric acid makes it possible to reduce the foaming starting temperature of sodium hydrogen carbonate to properly foam the entire tubular body even if the rubber component contains the SBR. Thus, the foam cell diameters can be made more uniform in the entire transfer roller.

<SBR>

Usable as the SBR are various SBRs synthesized by copolymerizing styrene and 1,3-butadiene by an emulsion polymerization method, a solution polymerization method and other various polymerization methods. The SBRs include those of an oil-extension type having flexibility controlled by addition of an extension oil, and those of a non-oil-extension type containing no extension oil. Either type of SBRs is usable.

According to the styrene content, the SBRs are classified into a higher styrene content type, an intermediate styrene content type and a lower styrene content type, and any of these types of SBRs is usable. Physical properties of the transfer roller can be controlled by changing the styrene content and the crosslinking degree.

These SBRs may be used either alone or in combination.

Where the rubber component includes the three types of rubbers including the SBR, the EPDM and the epichlorohydrin rubber and includes no polar rubber, the proportion of the SBR to be blended is preferably not less than 40 parts by mass and not greater than 90 parts by mass, particularly preferably not less than 60 parts by mass and not greater than 80 parts by mass, based on 100 parts by mass of the rubber component. Where the rubber component includes a polar rubber, the proportion of the SBR is preferably not less than 30 parts by mass and not greater than 50 parts by mass based on 100 parts by mass of the rubber component depending on the proportion of the polar rubber.

If the proportion of the SBR is less than the aforementioned range, the advantageous features of the SBR described above, i.e., higher versatility, lower costs and lower electrical resistivity, cannot be ensured.

If the proportion of the SBR is greater than the aforementioned range, the proportion of the EPDM is relatively reduced, making it impossible to impart the transfer roller with excellent ozone resistance. Further, the proportion of the epichlorohydrin rubber is also relatively reduced, making it impossible to impart the transfer roller with excellent ion conductivity.

Where an oil-extension type SBR is used, the proportion of the SBR described above is defined as the solid proportion of the SBR contained in the oil-extension type SBR.

<EPDM>

Usable as the EPDM are various EPDMs each prepared by introducing double bonds to a main chain thereof by employing a small amount of a third ingredient (diene) in addition to ethylene and propylene. A variety of EPDM products containing different types of third ingredients in different amounts are commercially available. Typical examples of the third ingredients include ethylidene norbornene (ENB), 1,4-hexadiene (1,4-HD) and dicyclopentadiene (DCP). A Ziegler catalyst is typically used as a polymerization catalyst.

The proportion of the EPDM to be blended is preferably not less than 5 parts by mass and not greater than 40 parts by mass, particularly preferably not greater than 20 parts by mass, based on 100 parts by mass of the rubber component.

If the proportion of the EPDM is less than the aforementioned range, it will be impossible to impart the transfer roller with excellent ozone resistance.

If the proportion of the EPDM is greater than the aforementioned range, on the other hand, the proportion of the SBR is relatively reduced, so that the advantageous features of the SBR, i.e., higher versatility, lower costs and lower electrical resistivity, cannot be ensured. Further, the proportion of the epichlorohydrin rubber is relatively reduced, making it impossible to impart the transfer roller with excellent ion conductivity.

<Epichlorohydrin Rubber>

Examples of the epichlorohydrin rubber include epichlorohydrin homopolymers, epichlorohydrin-ethylene oxide bipolymers (ECO), epichlorohydrin-propylene oxide bipolymers, epichlorohydrin-allyl glycidyl ether bipolymers, epichlorohydrin-ethylene oxide-allyl glycidyl ether terpolymers (GECO), epichlorohydrin-propylene oxide-allyl glycidyl ether terpolymers and epichlorohydrin-ethylene oxide-propylene oxide-allyl glycidyl ether quaterpolymers, which may be used either alone or in combination.

Of the aforementioned examples, the ethylene oxide-containing copolymers, particularly the ECO and/or the GECO are preferred as the epichlorohydrin rubber.

These copolymers preferably each have an ethylene oxide content of not less than 30 mol % and not greater than 80 mol %, particularly preferably not less than 50 mol %.

Ethylene oxide functions to reduce the roller resistance of the transfer roller. If the ethylene oxide content is less than the aforementioned range, however, it will be impossible to sufficiently provide the roller resistance reducing function and hence to sufficiently reduce the roller resistance of the transfer roller.

If the ethylene oxide content is greater than the aforementioned range, on the other hand, ethylene oxide is liable to be crystallized, whereby the segment motion of molecular chains is hindered to adversely increase the roller resistance of the transfer roller. Further, the transfer roller is liable to have a higher hardness after the crosslinking, and the electrically conductive rubber composition is liable to have a higher viscosity when being heat-melted before the crosslinking.

The ECO has an epichlorohydrin content that is a balance obtained by subtracting the ethylene oxide content from the total. That is, the epichlorohydrin content is preferably not less than 20 mol % and not greater than 70 mol %, particularly preferably not greater than 50 mol %.

The GECO preferably has an allyl glycidyl ether content of not less than 0.5 mol % and not greater than 10 mol %, particularly preferably not less than 2 mol % and not greater than 5 mol %.

Allyl glycidyl ether per se functions as side chains of the copolymer to provide a free volume, whereby the crystallization of ethylene oxide is suppressed to reduce the roller resistance of the transfer roller. However, if the allyl glycidyl ether content is less than the aforementioned range, it will be impossible to provide the roller resistance reducing function and hence to sufficiently reduce the roller resistance of the transfer roller.

Allyl glycidyl ether also functions as crosslinking sites during the crosslinking of the GECO. Therefore, if the allyl glycidyl ether content is greater than the aforementioned range, the crosslinking density of the GECO is increased, whereby the segment motion of molecular chains is hindered. This may adversely increase the roller resistance of the transfer roller. Further, the transfer roller is liable to suffer from reduction in tensile strength, fatigue resistance and flexural resistance.

The GECO has an epichlorohydrin content that is a balance obtained by subtracting the ethylene oxide content and the allyl glycidyl ether content from the total. That is, the epichlorohydrin content is preferably not less than 10 mol % and not greater than 69.5 mol %, particularly preferably not less than 19.5 mol % and not greater than 60 mol %.

Examples of the GECO include copolymers of the three comonomers described above in a narrow sense, as well as known modification products obtained by modifying an epichlorohydrin-ethylene oxide copolymer (ECO) with allyl glycidyl ether. In the present invention, any of these GECOs are usable.

The proportion of the epichlorohydrin rubber to be blended is preferably not less than 5 parts by mass and not greater than 40 parts by mass, particularly preferably not less than 10 parts by mass and not greater than 30 parts by mass, based on 100 parts by mass of the rubber component.

If the proportion of the epichlorohydrin rubber is less than the aforementioned range, it will be impossible to impart the transfer roller with excellent ion conductivity.

If the proportion of the epichlorohydrin rubber is greater than the aforementioned range, on the other hand, the proportion of the SBR is relatively reduced. Therefore, the advantageous features of the SBR, i.e., higher versatility, lower costs and lower electrical resistivity, cannot be ensured. Further, the proportion of the EPDN is also relatively reduced, making it impossible to impart the transfer roller with excellent ozone resistance.

<Polar Rubber>

As described above, the roller resistance of the transfer roller can be finely controlled by blending the polar rubber. Further, a more uniform porous structure free from foaming unevenness can be provided.

Examples of the polar rubber include an NBR, a CR, a BR and an ACM, which may be used either alone or in combination. Particularly, the NBR and/or the CR are preferred.

The NBR is classified in a lower acrylonitrile content type, an intermediate acrylonitrile content type, an intermediate to higher acrylonitrile content type, a higher acrylonitrile content type or a very high acrylonitrile content type depending on the acrylonitrile content. Any of these types of NBRs is usable.

The CR is synthesized, for example, by polymerizing chioroprene by an emulsion polymerization method. The CR is classified in a sulfur modification type or a non-sulfur-modification type depending on the type of a molecular weight adjusting agent to be used for the emulsion polymerization. The CR is also classified in a lower crystallization speed type, an intermediate crystallization speed type or a higher crystallization speed type depending on the crystallization speed. Any of these types of CRs is usable.

The proportion of the polar rubber to be blended may be properly determined according to the target roller resistance of the transfer roller. The proportion of the polar rubber is preferably not less than 5 parts by mass and not greater than 40 parts by mass, particularly preferably not less than 20 parts by mass, based on 100 parts by mass of the rubber component.

If the proportion of the polar rubber is less than the aforementioned range, it will be impossible to finely control the roller resistance of the transfer roller and to sufficiently provide the foaming unevenness preventing effect.

If the proportion of the polar rubber is greater than the aforementioned range, the proportion of the SBR is relatively reduced and, therefore, the advantageous features of the SBR, i.e., higher versatility, lower costs and lower electrical resistivity, cannot be ensured. Further, the proportion of the EPDM is relatively reduced, making it impossible to impart the transfer roller with excellent ozone resistance. In addition, the proportion of the epichlorohydrin rubber is relatively reduced, making it impossible to impart the transfer roller with excellent ion conductivity.

<Foaming Component>

Sodium hydrogen carbonate as the foaming agent and citric acid as the foaming assisting agent are used in combination as the foaming component.

The proportion of sodium hydrogen carbonate to be blended is preferably not less than 0.1 part by mass and not greater than 5 parts by mass based on 100 parts by mass of the rubber component.

If the proportion of sodium hydrogen carbonate is less than the aforementioned range, it will be impossible to sufficiently foam a tubular body formed by extruding the rubber composition by means of an extruder. If the proportion of sodium hydrogen carbonate is greater than the aforementioned range, the transfer roller is liable to be deteriorated in roller resistance and, particularly, in resistance characteristics when being allowed to stand at a higher temperature.

Where the proportion of sodium hydrogen carbonate is not less than 0.1 part by mass and not greater than 5 parts by mass based on 100 parts by mass of the rubber component, on the other hand, it is possible to sufficiently foam the tubular body while suppressing the deterioration of the resistance characteristics of the transfer roller when the transfer roller is allowed to stand at a higher temperature.

The proportion of citric acid is preferably not less than 0.1 part by mass and not greater than 0.5 parts by mass based on 100 parts by mass of the rubber component on an anhydride basis.

If the proportion of citric acid is less than the aforementioned range, it will be impossible to sufficiently provide the aforementioned effect of reducing the foaming starting temperature of sodium hydrogen carbonate to allow the transfer roller to have more uniform foam cell diameters as a whole by the blending of citric acid. If the proportion of citric acid is greater than the aforementioned range, it will be impossible to provide the effect of making the foam cell diameters more uniform in the entire transfer roller.

Where the proportion of citric acid is not less than 0.1 part by mass and not greater than 0.5 parts by mass based on 100 parts by mass of the rubber component on an anhydride basis, on the other hand, it is possible to further improve the effect of making the foam cell diameters more uniform in the entire transfer roller.

<Crosslinking Component>

The crosslinking component for crosslinking the rubber component includes a crosslinking agent, an accelerating agent and the like.

Examples of the crosslinking agent include a sulfur crosslinking agent, a thiourea crosslinking agent, a triazine derivative crosslinking agent, a peroxide crosslinking agent and various monomers, which may be used either alone or in combination. Among these crosslinking agents, the sulfur crosslinking agent is preferred.

Examples of the sulfur crosslinking agent include sulfur powder and organic sulfur-containing compounds. Examples of the organic sulfur-containing compounds include tetramethylthiuram disulfide and N,N-dithiobismorpholine. Sulfur such as the sulfur powder is particularly preferred.

The proportion of the sulfur to be blended is preferably not less than 0.2 parts by mass and not greater than 5 parts by mass, particularly preferably not less than 1 part by mass and not greater than 3 parts by mass, based on 100 parts by mass of the rubber component.

If the proportion of the sulfur is less than the aforementioned range, the electrically conductive rubber composition is liable to have a lower crosslinking speed as a whole, requiring a longer period of time for the crosslinking to reduce the productivity of the transfer roller. If the proportion of the sulfur is greater than the aforementioned range, the transfer roller is liable to have a higher compression set after the crosslinking, or an excess amount of the sulfur is liable to bloom on an outer surface of the transfer roller.

Examples of the accelerating agent include inorganic accelerating agents such as lime, magnesia (MgO) and litharge (PbO), and organic accelerating agents, which may be used either alone or in combination.

Examples of the organic accelerating agents include: guanidine accelerating agents such as di-o-tolylguanidine, 1,3-diphenylguanidine, 1-o-tolylbiguanide and a di-o-tolylguanidine salt of dicatechol borate; thiazole accelerating agents such as 2-mercaptobenzothiazole and di-2-benzothiazyl disulfide; sulfenamide accelerating agents such as N-cyclohexyl-2-benzothiazylsulfenamide; thiuram accelerating agents such as tetramethylthiuram monosulfide, tetramethylthiuram disulfide, tetraethylthiuram disulfide and dipentamethylenethiuram tetrasulfide; and thiourea accelerating agents, which may be used either alone or in combination.

According to the type of the crosslinking agent to be used, at least one optimum accelerating agent is selected from the various accelerating agents for use in combination with the crosslinking agent. For use in combination with the sulfur crosslinking agent, the accelerating agent is preferably selected from the thiuram accelerating agents and the thiazole accelerating agents.

Different types of accelerating agents have different crosslinking accelerating mechanisms and, therefore, are preferably used in combination. The proportions of the accelerating agents to be used in combination may be properly determined, and are preferably not less than 0.1 part by mass and not greater than 5 parts by mass, particularly preferably not less than 0.5 parts by mass and not greater than 2 parts by mass, based on 100 parts by mass of the rubber component.

The crosslinking component may further include an acceleration assisting agent.

Examples of the acceleration assisting agent include: metal compounds such as zinc white; fatty acids such as stearic acid, oleic acid and cotton seed fatty acids; and other conventionally known acceleration assisting agents, which may be used either alone or in combination.

The proportion of the acceleration assisting agent to be blended may be properly determined according to the types and combination of the rubbers of the rubber component, and the types and combination of the crosslinking agent and the accelerating agent.

<Other Ingredients>

As required, various additives may be added to the electrically conductive rubber composition. Examples of the additives include an acid accepting agent, a plasticizing component (a plasticizing agent, a processing aid and the like), a degradation preventing agent, a filler, an anti-scorching agent, a UV absorbing agent, a lubricant, a pigment, an anti-static agent, a flame retarder, a neutralizing agent, a nucleating agent, a co-crosslinking agent and the like.

In the presence of the acid accepting agent, chlorine-containing gases generated from the epichlorohydrin rubber during the crosslinking of the rubber component are prevented from remaining in the transfer roller. Thus, the acid accepting agent functions to prevent the inhibition of the crosslinking and the contamination of the photoreceptor body, which may otherwise be caused by the chlorine-containing gases.

Any of various substances serving as acid acceptors may be used as the acid accepting agent. Preferred examples of the acid accepting agent include hydrotalcites and Magsarat which are excellent in dispersibility. Particularly, the hydrotalcites are preferred.

Where the hydrotalcites are used in combination with magnesium oxide or potassium oxide, a higher acid accepting effect can be provided, thereby more reliably preventing the contamination of the photoreceptor body.

The proportion of the acid accepting agent to be blended is preferably not less than 0.2 parts by mass and not greater than 5 parts by mass, particularly preferably not less than 0.5 parts by mass and not greater than 2 parts by mass, based on 100 parts by mass of the rubber component.

If the proportion of the acid accepting agent is less than the aforementioned range, it will be impossible to sufficiently provide the effect of the blending of the acid accepting agent. If the proportion of the acid accepting agent is greater than the aforementioned range, the transfer roller is liable to have an increased hardness after the crosslinking.

Examples of the plasticizing agent include plasticizers such as dibutyl phthalate (DBP), dioctyl phthalate (DOP) and tricresyl phosphate, and waxes such as polar waxes. Examples of the processing aid include fatty acids such as stearic acid.

The proportion of the plasticizing component to be blended is preferably not greater than 5 parts by mass based on 100 parts by mass of the rubber component. This prevents the contamination of the photoreceptor body, for example, when the transfer roller is mounted in an image forming apparatus or when the image forming apparatus is operated. For this purpose, it is particularly preferred to use any of the polar waxes as the plasticizing component.

Examples of the degradation preventing agent include various anti-aging agents and anti-oxidants.

The anti-oxidants serve to reduce the environmental dependence of the roller resistance of the transfer roller and to suppress increase in roller resistance during continuous energization of the transfer roller. Examples of the anti-oxidants include nickel diethyldithiocarbamate (NOCRAC (registered trade name) NEC-P available from Ouchi Shinko Chemical Industrial Co., Ltd.) and nickel dibutyldithiocarbamate (NOCRAC NBC available from Ouchi Shinko Chemical Industrial Co., Ltd.)

Examples of the filler include zinc oxide, silica, carbon, carbon black, clay, talc, calcium carbonate, magnesium carbonate and aluminum hydroxide, which may be used either alone or in combination.

The mechanical strength and the like of the transfer roller can be improved by blending the filler.

Where electrically conductive carbon black is used as the filler, it is possible to improve the microwave absorbing efficiency of the entire electrically conductive rubber composition and to impart the transfer roller with electron conductivity.

A preferred example of the electrically conductive carbon black is HAF. The HAF is particularly excellent in microwave absorbing efficiency, and can be evenly dispersed in the electrically conductive rubber composition to impart the transfer roller with more uniform electron conductivity.

The proportion of the electrically conductive carbon black to be blended is preferably not less than 5 parts by mass and not greater than 25 parts by mass, particularly preferably not greater than 20 parts by mass, based on 100 parts by mass of the rubber component.

Examples of the anti-scorching agent include N-cyclohexylthiophthalimide, phthalic anhydride, N-nitrosodiphenylamine and 2,4-diphenyl-4-metyl-1-pentene, which may be used either alone or in combination. Particularly, N-cyclohexylthiophthalimide is preferred.

The proportion of the anti-scorching agent to be blended is preferably not less than 0.1 part by mass and not greater than 5 parts by mass, particularly preferably not greater than 1 part by mass, based on 100 parts by mass of the rubber component.

The co-crosslinking agent serves to crosslink itself as well as the rubber component to increase the overall molecular weight.

Examples of the co-crosslinking agent include ethylenically unsaturated monomers typified by methacrylates, metal salts of methacrylic acid and acrylic acid, polyfunctional polymers utilizing functional groups of 1,2-polybutadienes, and dioximes, which may be used either alone or in combination.

Examples of the ethylenically unsaturated monomers include:
(a) monocarboxylic acids such as acrylic acid, methacrylic acid and crotonic acid;
(b) dicarboxylic acids such as maleic acid, fumaric acid and itaconic acid;
(c) esters and anhydrides of the unsaturated carboxylic acids (a) and (b);
(d) metal salts of the monomers (a) to (c);
(e) aliphatic conjugated dienes such as 1,3-butadiene, isoprene and 2-chloro-1,3-butadiene;
(f) aromatic vinyl compounds such as styrene, α-methylstyrene, vinyltoluene, ethylvinylbenzene and divinylbenzene;
(g) vinyl compounds such as triallyl isocyanurate, triallyl cyanurate and vinylpyridine each having a hetero ring; and
(h) cyanovinyl compounds such as (meth)acrylonitrile and α-chloroacrylonitrile, acrolein, formyl sterol, vinyl methyl ketone, vinyl ethyl ketone and vinyl butyl ketone. These ethylenically unsaturated monomers may be used either alone or in combination.

Monocarboxylic acid esters are preferred as the esters (c) of the unsaturated carboxylic acids.

Specific examples of the monocarboxylic acid esters include:
alkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, n-pentyl (meth)acrylate, i-pentyl (meth)acrylate, n-hexyl (meth)acrylate, cyclohexyl (meth)acrylate, 2-ethylhexyl (meth)acrylate, octyl (meth)acrylate, i-nonyl (meth)acrylate, tert-butylcyclohexyl (meth)acrylate, decyl (meth)acrylate, dodecyl (meth)acrylate, hydroxymethyl (meth)acrylate and hydroxyethyl (meth)acrylate;
aminoalkyl (meth)acrylates such as aminoethyl (meth)acrylate, dimethylaminoethyl (meth)acrylate and butylaminoethyl (meth)acrylate;
(meth)acrylates such as benzyl (meth)acrylate, benzoyl (meth)acrylate and aryl (meth)acrylates each having an aromatic ring;
(meth)acrylates such as glycidyl (meth)acrylate, methaglycidyl (meth)acrylate and epoxycyclohexyl (meth)acrylate each having an epoxy group;
(meth)acrylates such as N-methylol (meth)acrylamide, γ-(meth)acryloxypropyltrimethoxysilane and tetrahydrofurfuryl methacrylate each having a functional group; and polyfunctional (meth)acrylates such as ethylene glycol di(meth)acrylate, trimethylolpropane tri(meth)acrylate, ethylene dimethacrylate (EDMA), polyethylene glycol dimethacrylate and isobutylene ethylene dimethacrylate. These monocarboxylic acid esters may be used either alone or in combination.

The inventive electrically conductive rubber composition containing the ingredients described above can be prepared in a conventional manner. First, the rubbers for the rubber component are blended in the predetermined proportions, and the resulting rubber component is simply kneaded. After additives other than the foaming component and the crosslinking component are added to and kneaded with the rubber component, the foaming component and the crosslinking component are finally added to and further kneaded with the resulting mixture. Thus, the electrically conductive rubber composition is provided. A kneader, a Banbury mixer, an extruder or the like, for example, is usable for the kneading.

<<Transfer Roller>>

FIG. 1 is a perspective view illustrating an exemplary transfer roller according to one embodiment of the present invention.

Referring to FIG. 1, the transfer roller 1 according to this embodiment is a tubular body of a single layer structure formed from the inventive electrically conductive rubber composition, and a shaft 3 is inserted through and fixed to a center through-hole 2 of the transfer roller 1.

The shaft 3 is a unitary member made of a metal such as aluminum, an aluminum alloy or a stainless steel. The shaft 3 is electrically connected to and mechanically fixed to the transfer roller 1, for example, via an electrically conductive adhesive agent. Alternatively, a shaft having an outer diameter that is greater than the inner diameter of the through-hole 2 is used as the shaft 3, and press-inserted into the through-hole 2 to be electrically connected to and mechanically fixed to the transfer roller 1. Thus, the shaft 3 and the transfer roller 1 are unitarily rotatable.

As described above, the transfer roller 1 is preferably produced by extruding the inventive electrically conductive rubber composition into an elongated tubular body by means of an extruder, continuously feeding out the extruded tubular body in the elongated state without cutting the tubular body to continuously pass the tubular body through a continuous crosslinking apparatus including a microwave crosslinking device and a hot air crosslinking device to continuously foam and crosslink the tubular body, then cutting the tubular body to a predetermined length and, as required, polishing an outer surface 4 of the resulting tubular body.

The polishing may be carried out at given time in the production process. In order to improve the workability and to suppress the deflection of the outer surface 4, however, it is preferred that the tubular body is but to a predetermined length and, with the shaft 3 inserted through and fixed to the tubular body as shown in FIG. 1, the tubular body is polished while being rotated about the shaft 3.

Figure 2:
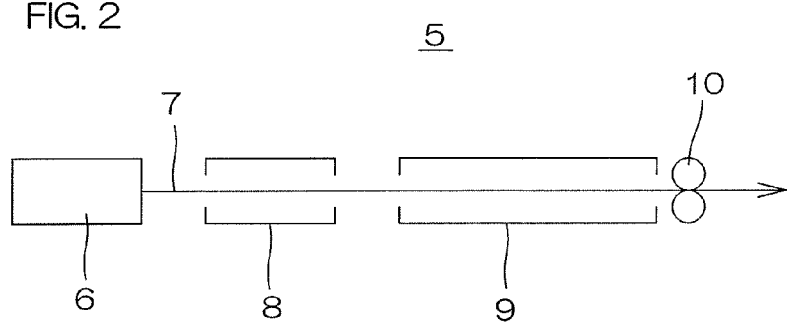
FIG. 2 is a block diagram schematically illustrating a continuous crosslinking apparatus to be used for production of the inventive transfer roller.

FIG. 2 is a block diagram for briefly explaining an example of the continuous crosslinking apparatus.

Referring to FIGS. 1 and 2, the continuous crosslinking apparatus 5 according to this embodiment includes a microwave crosslinking device 8, a hot air crosslinking device 9 and a take-up device 10 provided in this order on a continuous transportation path along which an elongated tubular body 7 formed by continuously extruding the inventive electrically conductive rubber composition by an extruder 6 for the transfer roller 1 is continuously transported in the elongated state without cutting by a conveyor (not shown) or the like. The take-up device 10 is adapted to take up the tubular body 7 at a predetermined speed.

First, the ingredients described above are mixed and kneaded together. The resulting electrically conductive rubber composition is formed into a ribbon shape, and continuously fed into the extruder 6 to be continuously extruded into the elongated tubular body 7 by operating the extruder 6.

In turn, the extruded tubular body 7 is continuously transported at a predetermined speed by the conveyor and the take-up device 10 to be passed through the microwave crosslinking device 8 of the continuous crosslinking apparatus 5, whereby the electrically conductive rubber composition forming the tubular body 7 is crosslinked to a certain crosslinking degree by irradiation with microwaves. Further, the inside of the microwave crosslinking device 8 is heated to a predetermined temperature, whereby the electrically conductive rubber composition is further crosslinked, and foamed by decomposition of the foaming agent.

Subsequently, the tubular body 7 is further transported to be passed through the hot air crosslinking device 9, whereby hot air is applied to the tubular body 7. Thus, the electrically conductive rubber composition is further foamed by the decomposition of the foaming agent, and crosslinked to a predetermined crosslinking degree.

Then, the tubular body 7 is passed through cooling water not shown to be cooled. Thus, a foaming and crosslinking step is completed, in which the tubular body 7 is foamed and crosslinked.

The continuous crosslinking apparatus 5 is detailed, for example, in Patent Literatures 1 and 2 described above.

The tubular body 7 formed from the electrically conductive rubber composition as having a crosslinking degree and a foaming degree each controlled at a desired level can be continuously provided by properly setting the transportation speed of the tubular body 7, the microwave irradiation dose of the microwave crosslinking device 8, the setting temperature and the length of the hot air crosslinking device 9, and the like (the microwave crosslinking device 8 and the hot air crosslinking device 9 may be each divided into a plurality of sections, and microwave irradiation doses and setting temperatures at these sections may be changed stepwise).

The tubular body 7 being transported may be twisted so that the microwave irradiation dose and the heating degree can be made more uniform throughout the entire tubular body 7 to make the crosslinking degree and the foaming degree of the tubular body 7 more uniform.

After the tubular body 7 thus foamed and crosslinked is cut to the predetermined length, the shaft 3 is inserted through and fixed to the through-hole 2 of the resulting tubular body 7 and, as required, the outer surface 4 of the tubular body 7 is polished. Thus, the transfer roller 1 having a porous structure is produced. The foamed and crosslinked tubular body 7 may be wound up, for example, by a winding device not shown to be once stored and, as demanded, the transfer roller 1 may be produced by performing the cutting step and the subsequent steps.

The continuous crosslinking process is thus performed with the use of the continuous crosslinking apparatus 5, thereby improving the productivity of the transfer roller 1 and further reducing the production costs of the transfer roller 1.

<Roller Resistance and Evaluation Against Variation in Roller Resistance>

The transfer roller 1 preferably has a roller resistance of not greater than $10^{10}\Omega$, particularly preferably not greater than $10^{9}\Omega$, as measured at an application voltage of 1000 V in an ordinary temperature and ordinary humidity environment at a temperature of 23° C. at a relative humidity of 55%.

Figure 3:
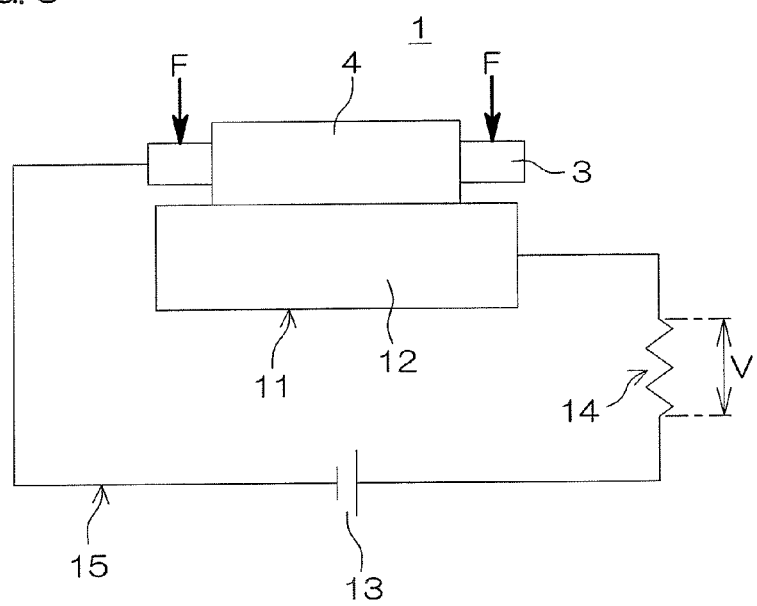
FIG. 3 is a diagram for explaining how to measure the roller resistance of the transfer roller.

FIG. 3 is a diagram for explaining how to measure the roller resistance of the transfer roller.

Referring to FIGS. 1 and 3, the roller resistance is expressed as a value determined through the following measurement method in the present invention.

An aluminum drum 11 rotatable at a constant rotation speed is prepared, and the outer surface 4 of the transfer roller 1 to be subjected to the measurement of the roller resistance is brought into abutment against an outer peripheral surface 12 of the aluminum drum 11 from above.

A DC power source 13 and a resistor 14 are connected in series between the shaft 3 of the transfer roller 1 and the aluminum drum 11 to provide a measurement circuit 15. The DC power source 13 is connected to the shaft 3 at its negative terminal, and connected to the resistor 14 at its positive terminal. The resistor 14 has a resistance r of 100Ω.

Subsequently, a load F of 500 g is applied to opposite end portions of the shaft 3 to bring the transfer roller 1 into press contact with the aluminum drum 11 and, in this state, a detection voltage V applied to the resistor 14 is measured by applying an application voltage E of DC 1000 V from the DC power source 13 between the shaft 3 and the aluminum drum 11 while rotating the aluminum drum 11 (at a rotation speed of 30 rpm). The measurement is performed 100 times in 4 seconds.

The roller resistance R of the transfer roller 1 is calculated from the following expression (i') based on the detection voltage V and the application voltage E (=1000 V):

$$R = (r \times E)/V - r \quad \text{(i')}$$

However, the term r of the expression (i') is negligible, so that the roller resistance of the transfer roller 1 is expressed as a value calculated from the following expression (i) in the present invention:

$$R = r \times E/V \quad \text{(i)}.$$

Roller resistance values R are calculated from the expression (i) based on the detection voltages V obtained by performing the measurement 100 times. The roller resistance R of the transfer roller 1 is defined as the average of the roller resistance values R.

<Hardness and Other Physical Properties>

The transfer roller 1 preferably has an ASKER-C hardness of not higher than 40 degrees as measured with a load of 500 gf (≈4.9 N) in an ordinary temperature and ordinary humidity environment at a temperature of 23° C. at a relative humidity of 55% by a measurement method specified by the Society of Rubber Industry Standards SRIS 0101 "Physical Test Methods for Expanded Rubber."

If the ASKER-C hardness of the transfer roller 1 is higher than the aforementioned range, the transfer roller 1 has an insufficient flexibility and fails to provide a sufficiently great nip width, making it impossible to provide the effect of improving the toner transfer efficiency and the effect of suppressing damage to the photoreceptor body.

Further, the transfer roller 1 can be controlled as having a predetermined compression set and a predetermined dielectric dissipation factor. In order to control the compression set, the ASKER-C hardness, the roller resistance and the dielectric dissipation factor of the transfer roller 1, the types and the amounts of the ingredients of the rubber composition may be properly determined.

<Image Forming Apparatus>

An image forming apparatus according to the present invention incorporates the inventive transfer roller. Examples of the inventive image forming apparatus include various electrophotographic image forming apparatuses such as laser printers, electrostatic copying machines, plain paper facsimile machines and printer-copier-facsimile multifunction machines.

EXAMPLES

Example 1

Preparation of Electrically Conductive Rubber Composition

A rubber component was prepared by blending 70 parts by mass of an SBR (SUMITOMO SBR1502 available from Sumitomo Chemical Co., Ltd.), 10 parts by mass of an EPDM (ESPRENE (registered trade name) EPDM505A available from Sumitomo Chemical Co., Ltd) and 20 parts by mass of an ECO (HYDRIN (registered trade name) T3108 available from Zeon Corporation).

A sodium hydrogen carbonate foaming agent (CELL-BORN FE-507 (trade name) available from Eiwa Chemical Industry Co., Ltd.) and a citric acid foaming assisting agent (citric acid monohydrate available from Yoneyama Yakuhin Kogyo Co., Ltd.) were used as the foaming component.

The proportion of sodium hydrogen carbonate was 2 parts by mass based on 100 parts by mass of the rubber component, and the proportion of citric acid was 0.5 parts by mass based on 100 parts by mass of the rubber component on an anhydride basis.

An electrically conductive rubber composition was prepared by blending ingredients shown below in Table 1 with the rubber component, and kneading the resulting mixture by means of a Banbury mixer.

TABLE 1

| Ingredients | Parts by mass |
| --- | --- |
| HAF | 10 |
| Acid accepting agent | 1.0 |
| Crosslinking agent | 1.6 |
| Accelerating agent DM | 1.6 |
| Accelerating agent TS | 2.0 |

The ingredients shown in Table 1 are as follows:
HAF: Electrically conductive carbon black (SEAST 3 (trade name) available from Tokai Carbon Co., Ltd.)
Acid accepting agent: Hydrotalcites (DHT-4A-2 available from Kyowa Chemical Industry Co., Ltd.)
Crosslinking agent: Sulfur powder
Accelerating agent DM: Di-2-benzothiazyl disulfide (SUNSINE MBTS (trade name) available from Shandong Shanxian Chemical Co., Ltd.)
Accelerating agent TS: Tetramethylthiuram monosulfide (SANCELER (registered trade name) TS available from Sanshin Chemical Industry Co., Ltd.)

The amounts (parts by mass) of the respective ingredients shown in Table 1 are based on 100 parts by mass of the rubber component.

(Production of Transfer Roller)

The electrically conductive rubber composition thus prepared was fed into an extruder, and extruded into an elongated tubular body having an outer diameter of 10 mm and an inner diameter of 3.0 mm by the extruder. The extruded tubular body 7 was continuously fed out in an elongated state without cutting to be continuously passed through the continuous crosslinking apparatus 5 including the microwave crosslinking device 8 and the hot air crosslinking device 9 shown in FIG. 2, whereby the rubber composition of the tubular body was continuously foamed and cross-linked. Then, the resulting tubular body was passed through cooling water to be continuously cooled.

The microwave crosslinking device 8 had an output of 6 to 12 kW and an internal control temperature of 150° C. to 250° C. The hot air crosslinking device 9 had an internal control temperature of 150° C. to 250° C. and an effective heating chamber length of 8 m.

The foamed tubular body 7 had an outer diameter of about 15 mm.

In turn, the tubular body 7 was cut to a predetermined length. The resulting tubular body was fitted around a shaft 3 having an outer diameter of 5 mm and an outer peripheral surface to which an electrically conductive thermosetting adhesive agent was applied, and heated at 160° C. for 60 minutes in an oven to cure the thermosetting adhesive agent. Thus, the tubular body was electrically connected to and mechanically fixed to the shaft 3.

After opposite end portions of the tubular body 7 were cut, the outer peripheral surface 4 of the tubular body 7 was polished by a traverse polishing process utilizing a cylindrical polisher to be thereby finished as having an outer diameter of 12.5 mm (with a tolerance of ±0.1 mm). Thus, a transfer roller 1 was produced.

Examples 2 and 3

Electrically conductive rubber compositions were prepared in substantially the same manner as in Example 1, except that the proportion of sodium hydrogen carbonate was 0.1 part by mass (Example 2) and 5 parts by mass (Example 3) based on 100 parts by mass of the rubber component. Then, transfer rollers were produced by using the electrically conductive rubber compositions thus prepared.

Example 4

An electrically conductive rubber composition was prepared in substantially the same manner as in Example 1, except that the proportion of citric acid was 0.1 part by mass based on 100 parts by mass of the rubber component on an anhydride basis. Then, a transfer roller was produced by using the electrically conductive rubber composition thus prepared.

Example 5

An electrically conductive rubber composition was prepared in substantially the same manner as in Example 1, except that 30 parts by mass of an NBR (a lower acrylonitrile content NBR JSR N250SL available from JSR Co., Ltd. and having an acrylonitrile content of 20%) was added as a polar rubber to the rubber component and the proportion of the SBR was 40 parts by mass. Then, a transfer roller was produced by using the electrically conductive rubber composition thus prepared.

Example 6

An electrically conductive rubber composition was prepared in substantially the same manner as in Example 1, except that 30 parts by mass of a CR (SHOPRENE (registered trade name) WRT available from Showa Denko K.K.) was added as a polar rubber to the rubber component and the proportion of the SBR was 40 parts by mass. Then, a transfer roller was produced by using the electrically conductive rubber composition thus prepared.

Comparative Example 1

An electrically conductive rubber composition was prepared in substantially the same manner as in Example 1, except that an ADCA foaming agent (VINYFOR AC#3 (trade name) available from Eiwa Chemical Industry Co., Ltd.) was blended alone as the foaming component in a proportion of 4 parts by mass based on 100 parts by mass of the rubber component. Then, a transfer roller was produced by using the electrically conductive rubber composition thus prepared.

Comparative Example 2

An electrically conductive rubber composition was prepared in substantially the same manner as in Example 1, except that the ADCA foaming agent and the sodium hydrogen carbonate foaming agent were blended in combination as the foaming component each in a proportion of 2 parts by mass based on 100 parts by mass of the rubber component. Then, a transfer roller was produced by using the electrically conductive rubber composition thus prepared.

Comparative Example 3

An electrically conductive rubber composition was prepared in substantially the same manner as in Example 1, except that the sodium hydrogen carbonate foaming agent was blended alone as the foaming component in a proportion of 4 parts by mass based on 100 parts by mass of the rubber component. Then, a transfer roller was produced by using the electrically conductive rubber composition thus prepared.

<Gas Generation>

In each of Examples and Comparative Examples, gases generated when the tubular body formed by extruding the electrically conductive rubber composition was continuously passed through the continuous crosslinking apparatus 5 for the foaming and the crosslinking were analyzed by means of a portable toxic gas monitor SC-01 available from Riken Keiki Co., Ltd. Where ammonia ($NH_3$) or carbon monoxide (CO) was generated at a concentration of not less than 0.5 ppm, this is indicated by "YES" in the row "Gas Generation" in Tables 2 and 3. Where ammonia ($NH_3$) or carbon monoxide (CO) was generated at a concentration of less than 0.5 ppm, this is indicated by "NO" in the row "Gas Generation" in Tables 2 and 3.

<Roller Resistance>

The roller resistance of each of the transfer rollers produced in Examples and Comparative Examples was measured at an application voltage of 1000 V in an ordinary temperature and ordinary humidity environment at a temperature of 23° C. at a relative humidity of 55% by the measurement method previously described with reference to FIG. 3. A transfer roller having a roller resistance of not less than $10^{6.5}\Omega$ and not greater than $10^{10}\Omega$ was rated as acceptable (○), and a transfer roller having a roller resistance falling outside this range was rated as unacceptable (x). In Tables 2 and 3, the roller resistance R is expressed as log R.

<Hardness>

The ASKER-C hardness of each of the transfer rollers 1 produced in Examples and Comparative Examples was measured in an ordinary temperature and ordinary humidity environment at a temperature of 23° C. at a relative humidity of 55% by the measurement method previously described. A transfer roller having an ASKER-C hardness of not greater than 40 degrees is rated as acceptable (○), and a transfer roller having an ASKER-C hardness of greater than 40 degrees is rated as unacceptable (x).

<Foam Cell Diameters>

The transfer rollers 1 produced in Examples and Comparative Examples were each cut perpendicularly to the axis of the shaft 3, and foam cell diameters of foam cells present in an outer region spaced a distance of 1 mm radially inward from the outer surface of the transfer roller and foam cell diameters of foam cells present in an inner region spaced a distance of 1 mm radially outward from the inner peripheral surface of the through-hole 2 were measured. The number of the foam cells in each of the regions for the measurement was 30. An average of the foam cell diameters of the foam cells present in the outer region and an average of the foam cell diameters of the foam cells present in the inner region were defined as an outer side foam cell diameter and as an inner side foam cell diameter, respectively. A difference between the outer side foam cell diameter and the inner side foam cell diameter was calculated. A transfer roller having a foam cell diameter difference of less than 50 μm is regarded as uniform in foam cell diameter (○), and a transfer roller having a foam cell diameter difference of more than 50 μm is regarded as non-uniform in foam cell diameter (x).

The results are shown in Tables 2 and 3.

TABLE 2

|  | Example 2 | Example 1 | Example 3 | Example 4 |
|---|---|---|---|---|
| Rubber component (parts by mass) | | | | |
| SBR | 70 | 70 | 70 | 70 |
| EPDM | 10 | 10 | 10 | 10 |
| ECO | 20 | 20 | 20 | 20 |
| NBR | — | — | — | — |
| CR | — | — | — | — |
| Foaming component | | | | |
| Sodium hydrogen carbonate | 0.1 | 2 | 5 | 2 |
| Citric acid | 0.5 | 0.5 | 0.5 | 0.1 |
| ADCA | — | — | — | — |
| Gas generation | | | | |
| NH$_3$ | NO | NO | NO | NO |
| CO | NO | NO | NO | NO |
| Roller resistance | | | | |
| log R (Ω) | 7.48 | 7.52 | 7.50 | 7.51 |
| Evaluation | ○ | ○ | ○ | ○ |
| ASKER-C hardness | | | | |
| Measurement (degree) | 34 | 34 | 38 | 33 |
| Evaluation | ○ | ○ | ○ | ○ |
| Foam cell diameter | ○ | ○ | ○ | ○ |

TABLE 3

|  | Example 5 | Example 6 | Comparative Example 1 | Comparative Example 2 | Comparative Example 3 |
|---|---|---|---|---|---|
| Rubber component (parts by mass) | | | | | |
| SBR | 40 | 40 | 70 | 70 | 70 |
| EPDM | 10 | 10 | 10 | 10 | 10 |
| ECO | 20 | 20 | 20 | 20 | 20 |
| NBR | 30 | — | — | — | — |
| CR | — | 30 | — | — | — |
| Foaming component | | | | | |
| Sodium hydrogen carbonate | 2 | 2 | — | 2 | 4 |
| Citric acid | 0.5 | 0.5 | — | — | — |
| ADCA | — | — | 4 | 2 | — |
| Gas generation | | | | | |
| NH$_3$ | NO | NO | YES | YES | NO |
| CO | NO | NO | YES | YES | NO |
| Roller resistance | | | | | |
| log R (Ω) | 7.62 | 7.59 | 7.68 | 7.44 | 7.48 |
| Evaluation | ○ | ○ | ○ | ○ | ○ |
| ASKER-C hardness | | | | | |
| Measurement (degree) | 30 | 30 | 33 | 32 | 39 |
| Evaluation | ○ | ○ | ○ | ○ | ○ |
| Foam cell diameter | ○ | ○ | ○ | x | x |

The results for Comparative Examples 1 and 2 in Table 3 indicate that, where ADCA is used as the foaming component, ammonia and carbon monoxide are generated and that, even if ADCA and sodium hydrogen carbonate are used in combination as described in Patent Literatures 1 and 2, it is impossible to prevent the generation of these gases.

The results for Comparative Example 3 indicate that, where sodium hydrogen carbonate is used alone instead of ADCA, it is possible to prevent the generation of ammonia and carbon monoxide, but the foam cell diameters are non-uniform.

The results for Examples 1 to 6 in Tables 2 and 3 indicate that, where sodium hydrogen carbonate is used in combination with citric acid, it is possible to make the foam cell diameters more uniform while preventing the generation of ammonia and carbon monoxide.

The results for Examples 1 to 4 in Table 2 indicate that the proportion of sodium hydrogen carbonate is preferably not less than 0.1 part by mass and not greater than 5 parts by mass based on 100 parts by mass of the rubber component, and that the proportion of citric acid is preferably not less than 0.1 part by mass and not greater than 0.5 parts by mass based on 100 parts by mass of the rubber component on an anhydride basis.

The results for Examples 1, 5 and 6 indicate that the roller resistance of the transfer roller can be finely controlled by blending a polar rubber in the rubber component.

This application corresponds to Japanese Patent Application No. 2013-058801 filed in the Japan Patent Office on Mar. 21, 2013, the disclosure of which is incorporated herein by reference in its entirety.

What is claimed is:

1. A transfer roller which is made from an electrically conductive rubber composition comprising a tubular body having:

a roller resistance of not less than $10^{6.5}$ Ω and not greater than $10^9$ Ω as measured at an application voltage of 1000 V in an environment at a temperature of 23° C. and a relative humidity of 55%; and an ASKER-C hardness of not greater than 40 degrees as measured with a load of 500 gf (≈4.9 N) in an environment at a temperature of 23° C. and a relative humidity of 55% by a measurement method, the electrically conductive rubber composition comprises:
a rubber component;
a crosslinking component for crosslinking the rubber component; and
a foaming component for foaming the rubber component,
wherein the rubber component includes at least a styrene butadiene rubber, an ethylene propylene diene rubber and an epichlorohydrin rubber,
wherein the foaming component includes sodium hydrogen carbonate as a foaming agent and citric acid as a foaming assisting agent,
wherein the sodium hydrogen carbonate is present in a proportion of not less than 0.1 parts by mass and not greater than 5 parts by mass based on 100 parts by mass of the rubber component, and
wherein the citric acid is present in a proportion of not less than 0.1 parts by mass and not greater than 0.5 parts by mass based on 100 parts by mass of the rubber component on an anhydride basis.

2. The transfer roller according to claim 1, which is produced through the step of extruding the electrically conductive rubber composition into a tubular body, and continuously foaming and crosslinking the rubber composition of the tubular body by means of the continuous crosslinking apparatus including the microwave crosslinking device and the hot air crosslinking device.

3. An image forming apparatus which incorporates the transfer roller according to claim 2.

4. The transfer roller according to claim 1, wherein the styrene butadiene rubber is present in an amount of 30 to 90 parts by mass based on 100 parts by mass of the rubber component, the ethylene propylene diene rubber is present in an amount of 5 to 40 parts by mass based on 100 parts by mass of the rubber component, and the epichlorohydrin rubber is present in an amount of 5 to 40 parts by mass based on 100 parts by mass of the rubber component.

5. The transfer roller according to claim 1, wherein the rubber component additionally comprises at least one polar rubber selected from the group consisting of an acrylonitrile butadiene rubber, a chloroprene rubber, a butadiene rubber and an acryl rubber.

6. The transfer roller according to claim 5, wherein the polar rubber is present in an amount of 5 to 40 parts by mass based on 100 parts by mass of the rubber component.

7. The transfer roller according to claim 6, wherein the styrene butadiene rubber is present in an amount of 30 to 50 parts by mass based on 100 parts by mass of the rubber component, the ethylene propylene diene rubber is present in an amount of 5 to 40 parts by mass based on 100 parts by mass of the rubber component, and the epichlorohydrin rubber is present in an amount of 5 to 40 parts by mass based on 100 parts by mass of the rubber component.

* * * * *